United States Patent
Bhanjois et al.

(10) Patent No.: US 7,140,015 B1
(45) Date of Patent: Nov. 21, 2006

(54) MICROKERNEL FOR REAL TIME APPLICATIONS

(75) Inventors: Bhimsen Bhanjois, Santa Clara, CA (US); Lakshman Narayanaswamy, Santa Clara, CA (US); Srinivas Pothapragada, Hyderabad (IN); Naidu Bollineni, Sunnyvale, CA (US); Pradeep Kankipati, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 09/408,149

(22) Filed: Sep. 29, 1999

(51) Int. Cl.
*G06F 9/44* (2006.01)

(52) U.S. Cl. .................. 718/100; 718/103; 718/107

(58) Field of Classification Search ........ 709/100–104, 709/106–108, 310, 313, 314; 718/100–104, 718/106–108; 719/310, 313, 314
See application file for complete search history.

(56) References Cited

U.S. PATENT DOCUMENTS

| | | | | |
|---|---|---|---|---|
| 4,993,017 A * | 2/1991 | Bachinger et al. | .......... | 370/360 |
| 5,485,579 A * | 1/1996 | Hitz et al. | .......... | 709/221 |
| 5,526,521 A * | 6/1996 | Fitch et al. | .......... | 709/108 |
| 5,721,922 A * | 2/1998 | Dingwall | .......... | 718/103 |
| 5,729,710 A * | 3/1998 | Magee et al. | .......... | 711/203 |
| 5,742,825 A * | 4/1998 | Mathur et al. | .......... | 719/329 |
| 5,745,759 A | 4/1998 | Hayden et al. | .......... | 395/680 |
| 5,764,984 A | 6/1998 | Loucks | .......... | 395/682 |
| 5,771,383 A * | 6/1998 | Magee et al. | .......... | 709/312 |
| 5,835,764 A * | 11/1998 | Platt et al. | .......... | 709/101 |
| 5,838,968 A | 11/1998 | Culbert | .......... | 395/674 |
| 5,903,752 A | 5/1999 | Dingwall et al. | .......... | 395/673 |
| 5,995,745 A * | 11/1999 | Yodaiken | .......... | 703/26 |
| 6,092,095 A * | 7/2000 | Maytal | .......... | 718/100 |
| 6,167,425 A * | 12/2000 | Beckhoff | .......... | 718/103 |
| 6,192,514 B1 * | 2/2001 | Lurndal | .......... | 717/149 |
| 6,424,988 B1 * | 7/2002 | Lurndal | .......... | 709/106 |
| 6,466,962 B1 * | 10/2002 | Bollella | .......... | 709/107 |
| 6,507,861 B1 * | 1/2003 | Nelson et al. | .......... | 718/104 |

OTHER PUBLICATIONS

Ramamritham et al., "Scheduling Algorithms and Operating Systems Support for Real-Time Systems", Proceedings of the IEEE, vol. 82, No. 1, Jan. 1994, pp. 55-67.*
Ritchie et al., "User Level IPC and Device Management in the Raven Lemel", Proceedings of the USENIX Microkernels and Other Kernel Architectures Symposium, Sep. 20-23, 1993, pp. 1-15.*
Ford et al., "Microkernels Meet Recursive Virtual Machines", Department of Computer Science University of Utah, May 10, 1996, pp. 1-15.*
Jochen Liedtke, "On u-Kernel Construction", German National Research Center for Information Technology, 1995, pp. 237-250.*
Theory of Operation, Auspex, Version 1.0.1, Module-4, pp. 165-247.
Auspex, 4Front NS2000, product information, 1999.
NetServer Theory of Operation, Version 1.0.2, Auspex, Module-4, 166-258, 1997.
NetServer Overview, Version 1.02, Auspex, Module-2, 32-92, 1997.

* cited by examiner

*Primary Examiner*—Chun Cao
(74) *Attorney, Agent, or Firm*—Fish & Richardson P.C.

(57) ABSTRACT

An operating system includes a non-preemptive microkernel executing one or more processes in accordance with a predetermined priority; and one or more kernels adapted to be executed as one or more processes by the non-preemptive microkernel.

26 Claims, 12 Drawing Sheets

MICROKERNEL FOR REAL TIME APPLICATIONS

The invention relates to operating systems with real-time capability.

System administration convenience and ease of accessibility have been driving the growth of computer networks. In a computer network, individual user workstations are referred to as clients, and shared resources for filing, printing, data storage and wide-area communications are referred to as servers. Clients and servers are all considered nodes of a network. Client nodes use standard communications protocols to exchange service requests and responses with the servers. The servers in turn execute various processes, as controlled by the servers' operating systems.

The operating systems for these servers face a growing need to deliver higher data availability, faster access to shared data, and reduced administrative costs through network data consolidation. Additionally, certain tasks dealing with communications and natural data types such as audio/video streaming require real-time responses. In these applications, if a delay exists in the capture or playback of audio or video data, a user at the client nodes may hear clicks and pops from audio data output and see modulating or jerky video output. Furthermore, a natural playback of audio and video data requires that the audio/video data transmission be synchronized. Hence, in addition to handling requests efficiently, the operating system also needs to provide real-time capabilities.

Additionally, the operating system needs to support multitasking. Multitasking and real time processing are attributes of an operating system that are closely related to scheduling. Multitasking is a scheduling scheme that allows the process to work on more than one process or task at a time. Real time processing refers to the scheduling constraint that a process must be scheduled and executed within a predictable period of time because of some external, "real world" timing requirement. Real time processing is important for application programs that execute in predictable period of time. In a multitasking operating system, the operating system implements a scheduling scheme so that real time applications are scheduled to run in a predictable period of time. To support real time processing, an operating system needs to have some form of preemptive scheduling, that is the process of interrupting a currently running process to run a higher priority process, such as a real time application program. To ensure that the real time application is processed in a predictable period of time, the operating system needs to be able to gain control of the processor, possibly preempting the currently running process, and schedule the real time process regardless of other processes in the system.

A traditional operating system is logically layered and divided into two main portions: the kernel and user programs. The kernel interfaces with and controls the hardware, and also provides the user programs with a set of abstract system services called system calls. The kernel runs at a kernel level, where it can execute privileged operations and allows the kernel to have full control over the hardware as well as user level programs. This centralization provides an environment where all programs share the underlying hardware in a coordinated fashion.

Traditional kernels have been implemented as a monolithic program. More recently, the monolithic kernel has been partitioned into independent modules to enhance flexibility in implementing the operating system as well as to modify various services associated with the kernel. In the microkernel, certain services are migrated outside of the kernel and run at a user level in special server processes. Typically, the microkernel performs only inter-process communication (IPC) and process scheduling. External processes then use these core services to implement the remainder of the operating system functionally. The removal of complexity from the kernel allows a more efficient IPC implementation, that reduces the performance penalty incurred (from communicating with external service-providing processes) such that the microkernel can be comparable in performance to the monolithic kernel.

When a user requests a program to be executed, a new process is created to encompass its execution. The process is a combination of the program plus the current state of its execution that normally includes the values of all variables, as well as the conditions of the hardware (the program counter, registers and condition code, among others and the contents of the address space). The process exists within the system until it terminates, either by itself as designed, by the kernel, or by the request of the user. The process itself is an abstraction. The management of program execution can be controlled by modifying the scheduling priority of processes.

In traditional operating systems including the Unix operating system, the kernel schedules only processes for execution since all system activities, whether user or kernel level, occur within the context of some process. When using traditional time-sharing scheduling policies, processes executing at the user level may be time sliced at any time in order to share the processing resources fairly among all processes. Processes operating at the kernel level are exempt from time slicing. A switch to a different process while executing at the kernel level is typically performed only when the current kernel process explicitly allows it to occur.

As discussed above, there are often times when certain applications demand a different scheduling algorithm than what the operating system provides. Typically, the vendors of the operating systems modify a scheduler to provide a real-time like response, rather than give the flexibility to the user. Other vendors run the real-time kernels as processes under the operating system. However, in such an approach, the scheduler of the time sliced operating system can preempt the real-time kernel at will and defeat the purpose of the real-time nature of the kernels that are running as processes.

SUMMARY OF THE INVENTION

An operating system includes a non-preemptive microkernel executing one or more processes in accordance with a predetermined priority; and one or more kernels adapted to be executed as one or more processes by the non-preemptive microkernel.

Implementations of the invention include one or more of the following. One of the kernels can execute an operating system. The operating system can be a time-sliced operating system such as Unix. Each process has its own stack, and the processes can communicate using one or more messages. Each process also has a unique process identifier (PID). A mailbox connected to a plurality of processes can service messages sent to a single PID. The processes executed by the system never terminate. The kernel executed as a process can be a monolithic kernel or can be a microkernel.

Advantages of the invention include one or more of the following. Real-time applications such as multimedia streaming, voice/audio processing and applications operating with natural data types are supported without allowing other operations to disrupt the capture, delivery or playback of data. No modification to the operating system's scheduling algorithm is needed. Moreover, the operating system applications that are running as processes are protected without degrading the real-time response capability of the operating system.

The non-preemptive micro kernel that can run other micro kernels or operating systems as processes and protect the nature of that kernel that has piggybacked. For example, a user can run the Unix operating system as a process and schedule Unix to run to protect the nature of all the applications that are running on Unix. When Unix gets control of the computer, it can run applications such as Web CGI scripts to generate network or file system or storage tasks.

The microkernel offers scalability: simply by including or excluding additional microkernel processes, the functionality (and resource requirements) of the operating system could be scaled to address different application needs requiring different operating systems using the same microkernel. The microkernel also offers extensibility achieved by adding specific operating system microkernels running as processes. Moreover, these functionality enhancements can be readily accomplished by the users, rather than requiring (or waiting for) the hardware vendor to implement them. The microkernel also offers a high degree of concurrency, since one operating system microkernel can run as several concurrent processes, it can provide greater concurrency than a single microkernel.

The microkernel may also manage an adaptive file system that is tuned for specific applications. The tuning process is simple, and only requires the user or suitable software to select from a list of options as to the characterization of the processing load.

The resulting server with the microkernel is powerful, scalable and reliable enough to allow users to consolidate their data onto one high performance system instead of sources of smaller, less reliable systems. This consolidation of data resources onto a powerful server brings a number of advantages to the client-server environment. The consolidation of data reduces the need to replicate data and to manage the consistency of the replicated data. Data is available more quickly and reliably then conventional client-server architecture.

Other features and advantages will be apparent from the following description and the claims.

BRIEF DESCRIPTION OF THE DRAWINGS

The invention will be described with respect to particular embodiment thereof, and reference will be made to the drawings, in that.

DESCRIPTION OF THE PREFERRED EMBODIMENTS

Figure 1:
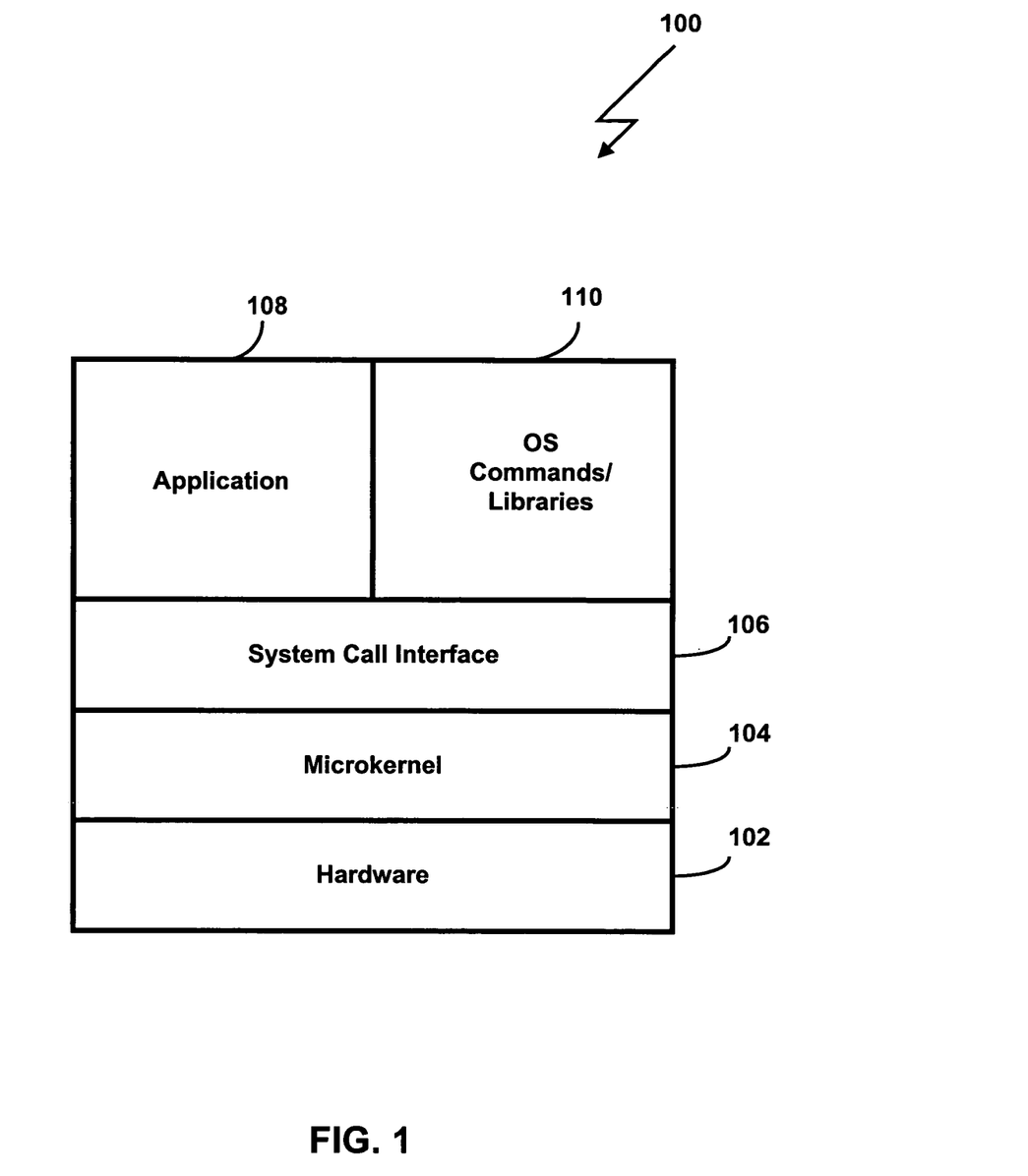
FIG. 1 is a diagram illustrating a microkernel that manages one or more additional microkernels as processes.

Referring now to FIG. 1, various layers executing in a computer environment 100 are shown. The computer environment 100 has a hardware layer 102, a microkernel layer 104, a system call interface layer 106, an application portion 108 and an operating system command/library portion 110.

The microkernel layer 104 interfaces with the hardware layer 102. The microkernel layer 104 runs at a kernel level where the microkernel layer can execute privilege operations to allow the kernel to have full control over the hardware and user level programs. The application portion 108 and the OS command/library portion 110 run at a user level. The user level interacts with the kernel level through various systems call interfaces. The user level executes at an unprivileged execution state of the hardware and thus are executed in a restricted environment, controlled by the microkernel layer. Hence, the microkernel layer prevents simultaneously executed programs from interfering with one another either intentionally or maliciously. The microkernel layer 104 executes a non-preemptive microkernel that can run other kernels or microkernels as processes. As such, the microkernel layer 104 can protect the nature of kernels that have "piggybacked" onto the microkernel layer 104. For instance, the user can run the Unix operation system as a process managed by the microkernel layer 104.

A process performs a sequence of actions. A processor can perform only one action (of one process) at a time. Each processor can be executing a different process, concurrently. All processes running on a given processor share the same address space, including external variables and program code. Each process has its own stack, i.e., automatic variables and function arguments are local to each process.

A process in this abstraction is very "light weight" compared to a regular Unix process. A process in this abstraction requires as little as a few hundred bytes of memory for the process descriptor and a stack. Many processes can run on each processor. Process switching time is very small because only the stack pointer and caller-saved registers need to be saved and restored. All local processes run in the same address space, so there are no memory maps to switch. The microkernel layer contributes negligible CPU overhead for single-process applications as well as most multiprocessing applications.

Figure 2:
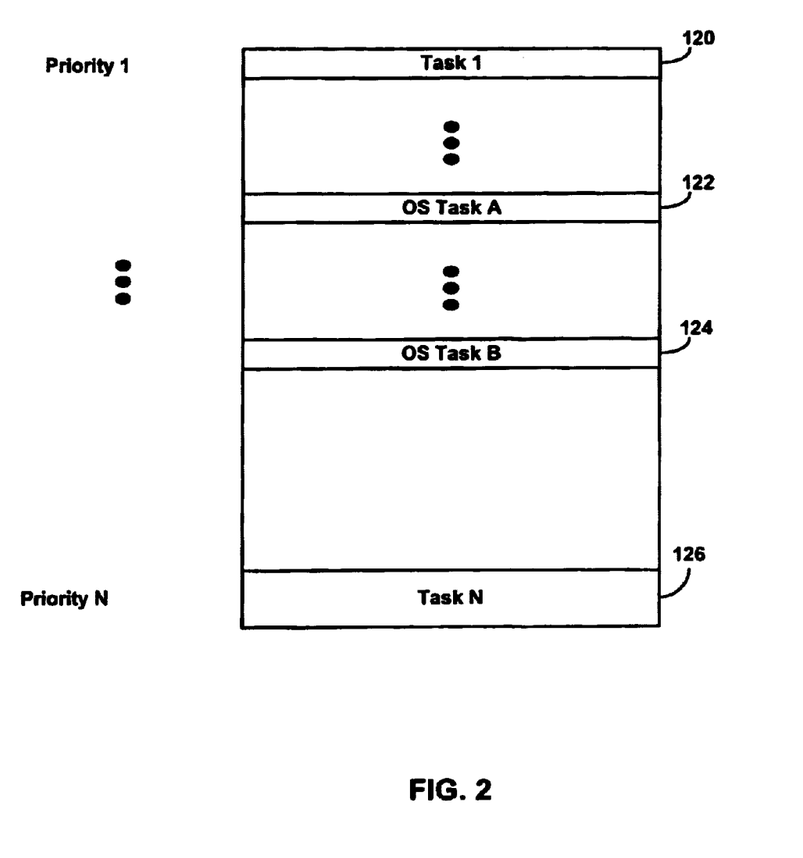
FIG. 2 is a diagram of tasks executed by the microkernel of FIG. 1.

The microkernel layer 104 is a task-based operating system and executes a plurality of tasks, as shown in FIG. 2. Tasks 120, 122, 124 and 126 are executed in a predetermined priority sequence that is shown in FIG. 2 as priority levels 1 through priority level N. Any of the tasks can be used to execute an operating system kernel or microkernel. Thus, in the exemplary embodiment of FIG. 2, tasks 122 and 124 are processes associated with different operating systems.

The microkernel layer 104 in effect becomes a "dominant" operating system that loads "sub-dominant" operating systems for execution. Each sub-dominant operating system environment is set up as a process that depends from the dominant operating system. The dominant operating system can run one or more functional processing operations such as networking, file system, and storage. The sub-dominant operating systems in turn run application specific processes such as SNMP decoding, Java bytecode execution or CGI scripting operations.

Figure 3:
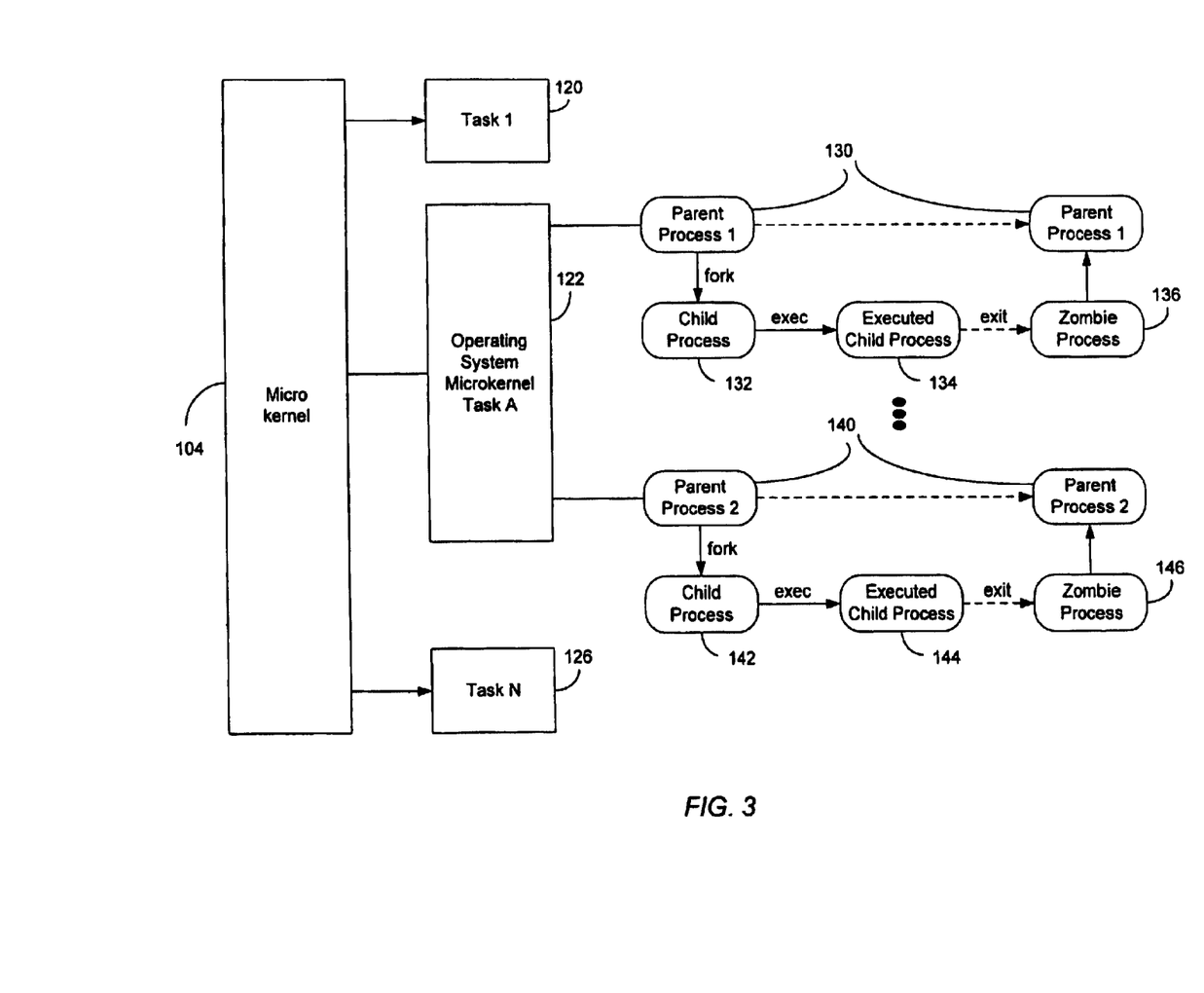
FIG. 3 is a diagram illustrating the microkernel of FIG. 1 executing another kernel.

The relationship between the microkernel layer 104 and the operating system tasks it supports is show in more detail in FIG. 3. In this exemplary configuration, the microkernel layer 104 executes task 1 120, the operating system microkernel task 122 and task N 126. The operating system microkernel task 122 in turn runs an operating system such as Unix and a plurality of processes executed by the operating system of task 122. For instance, the task 122 can execute a parent process 1 130 that can fork and generate one or more child processes 132 that become executed child processes 134. Upon completion of the executed child processes 134, the executed child processes become zombie processes 136 and control is returned to the parent process 130. Similarly, the task 122 can execute a parent process 2 140 that can fork and generate one or more child processes 142 that become executed child processes 144. Upon completion of the executed child processes 144, the executed child processes become zombie processes 146 and control is returned to the parent process 140.

Figure 4:
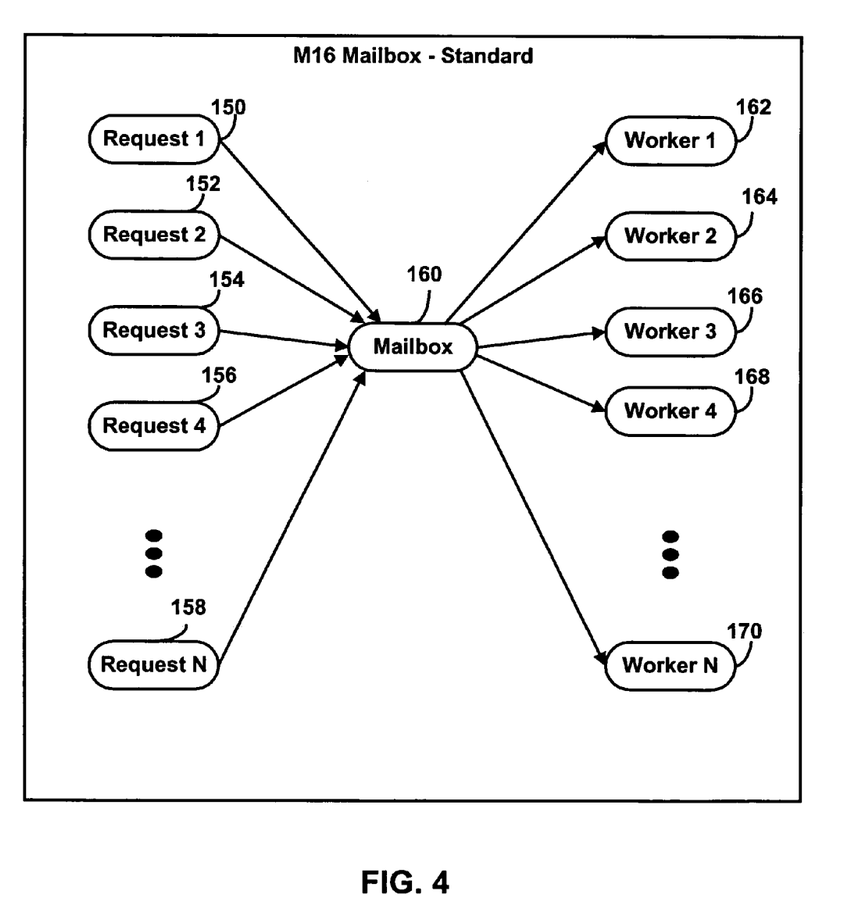
FIG. 4 shows communication pathways between requestors and workers.

Referring now to FIG. 4, communications to and from a mailbox 160 are shown. Some applications require several "worker" threads of control to serve messages from other processes, but need a single process identifier (PID) to that those other processes would send the message. For this purpose, a mailbox is used. The mailbox 160 receives incoming messages from a plurality of requests as 150, 152, 154, 156, and 158. The mailbox 160 in turn communicates with a plurality of workers 162, 164, 166, 168 and 170.

In a standard mailbox, a client sends a work request to the manager; the manager then sends the work request to an idle worker. In an inverted mailbox, a client asks the manager for the name of an idle worker and the manager responds to the client with the name of the idle worker; the client then sends the work request directly to the worker, not through the manager.

Mailboxes are created by a process converting itself to a mailbox and messages sent to that PID will queue up at that mailbox. A destination to that a message can be sent, and a sender to that a reply to a message is returned, is identified by a unique 32-bit PID. Definition of one exemplary PID Type is shown below:

```
/*
* To the user, PIDs are just integers. To the kernel, they
* consist of 8-bits of virtual IPC slot, and 20 bits identifying
   the
* local process.
*
*/
typedef long K_PID;/* Pid as seen by user. */
typedef struct m16_pid_t {/* Pid as seen by m16 kernel */
unsigned pid_slot: 8;
unsigned :4;
unsigned pid_proc: 20;
} M16_PID_T;
```

A process can create a new process on the same process by calling pid=k create(func, stack_size, priority, arg);

where func is a pointer to the function that the process will execute, and arg is an argument, of type long, that is passed to func, stack_size specifies the size in bytes of the process' stack, and priority specifies the process' scheduling priority level.

Once a process is created it lives forever. The function executed by a process must never return; however, it may call other functions that return.

The process states include ready, blocked, or waiting. A process is said to be ready if it is able to perform the next action of its program. A process that is not ready is said to be blocked. A process is blocked when it does any one of the following:

sends a message to another process
   waits to receive a message from another process or from
      the kernel timer service
   waits for a hardware interrupt to occur When a process requests certain system services, such as registering or looking up process names, the process sends a request to a kernel process; this causes the requesting process to become blocked. When a process becomes ready, it is placed in its processor's ready queue. Processes in the ready queue are ordered from highest to lowest priority. Within each priority level, processes execute in the order in that they became ready.

When a process is blocked, it relinquishes the processor, and the processor is allocated to the process at the head of the ready queue. If the ready queue becomes empty, the processor is allocated to the next process to become ready. The microkernel is non-preemptive, so processes give up the CPU only when they block, or when they explicitly request to be preempted.

For each way that a process can be blocked, there is a corresponding way that it can become ready:

A process blocked after sending a message becomes ready
      when some other process replies to the message
   A process blocked waiting for a message to arrive
      becomes ready when one does. The message may be
      from another process, or it may be an alarm message
      delivered by the kernel.
   A process that is blocked waiting for a hardware interrupt
      becomes ready when the interrupt occurs.

Figure 5:
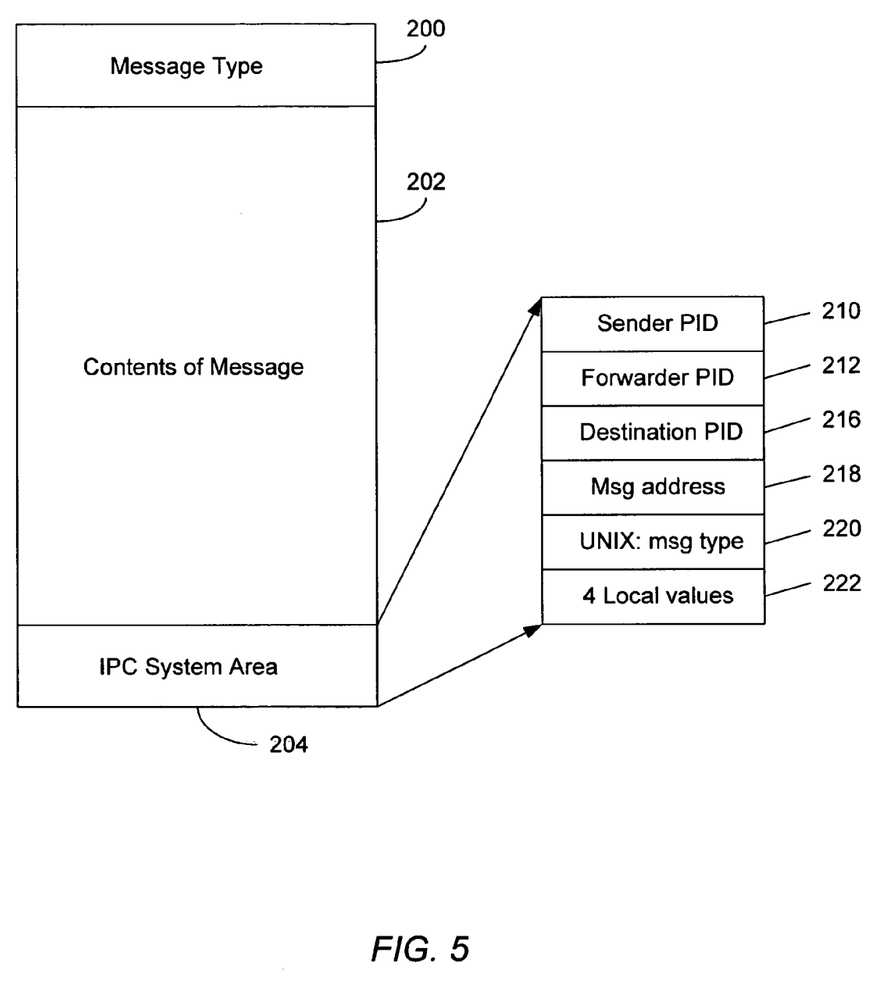
FIG. 5 is a diagram illustrating the components of a message.

FIG. 5 shows components associated with a message. A message is a fixed-sized vector containing K_MSG_SIZE bytes of data. The first section of every message is a message type field 200 that identifies a function requested by the message. Data is stored in a message content area 202. Messages also include private information and may need to obey special alignment required by hardware. An IPC system area 204 is used for local message administration purposes and is not retrieved by a receiving processor. Only the message type and the data stored in the message content area of a message are retrieved by the receiving processor. In one implementation, the IPC system area 204 includes a sender PID 210, a forwarder PID 212, and a destination PID 126. The IPC system area 204 also includes a message address 218 and a message type (e.g., UNIX) 220. The IPC system area can have local values 222.

All communication between boards is through primitives to send, receive, and reply with their options. When a process sends a message, it goes to sleep. When a reply is sent for that message, the kernel locates the message (via the address contained in the reply message descriptor) and within that message it finds the processing structure. It then links the reply message to the processing structure and places the process on the run queue. Once the process is running, it finds the reply message on its own processing structure.

Figure 6:
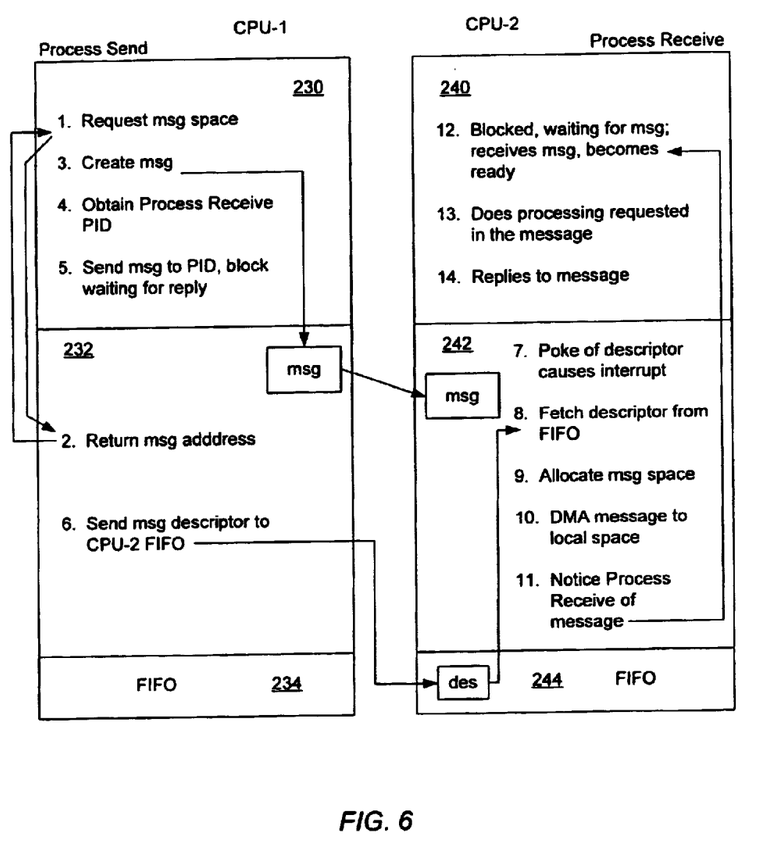
FIG. 6 is a diagram illustrating a message send process.

FIG. 6 illustrate in more detail the use of a message in sending data to a process. FIG. 6 depicts an example message communication between a process running on CPU-1 (Process Send) and a process running on CPU-2

(Process Receive). A user-level process space 230, a microkernel layer 232, and a FIFO 234 are associated with CPU-1. A user-level process space 240, a microkernel layer 242, and a FIFO 244 are associated with CPU-2. As shown therein, the steps of sending data to a process include:

1. The sending process (Process Send) implements k_alloc_msg( ) to obtain a message.
2. A message is obtained from a free message list. The microkernel layer 232 allocates space for additional messages if there are no messages in the free message list. If a message vector cannot be allocated due to insufficient memory, k_alloc_msg( ) will panic the board. All processes running on a processor share the same address space.
3. The sending process creates the message.
4. Messages are sent to a PID. Therefore, the sending process obtains the PID of the receiving process (Process Receive). In general, this occurs only at boot-up, since processes never terminate.
5. The sending process sends the message to the PID of the receiving process; the sending process blocks waiting for the reply.
6. The microkernel layer 232 on CPU-1 pokes a message descriptor (the address of the message) into FIFO 244 of CPU-2.
7. Poking of the message descriptor into the FIFO 244 of CPU-2 causes an interrupt on CPU-2.
8. The microkernel layer 242 on CPU-2 fetches message descriptor from its FIFO 244.
9. The microkernel layer 242 on CPU-2 implements a k_alloc_msg( ) to allocate local space for the message.
10. The microkernel layer 242 on CPU-2 DMAs the message from the VME (Versa Module Europe bus standard) space address included in the message descriptor. The message includes the PID of the sender so that the receiving process knows to where to reply.
11. The microkernel layer 242 on CPU-2 passes the local-space address of message to the receiving process in the user-level process space 240.
12. The receiving process has been sleeping at k_receive( ) (i.e., blocked) waiting for a message; receipt of message causes the receiving process to become ready.
13. The receiving process does the processing requested in the message.
14. The receiving process sends a reply (this does not cause the receiving process to block). In this example, the receiving process returns to sleeping at k_receive( ), blocked until the next message arrives.

Figure 7:
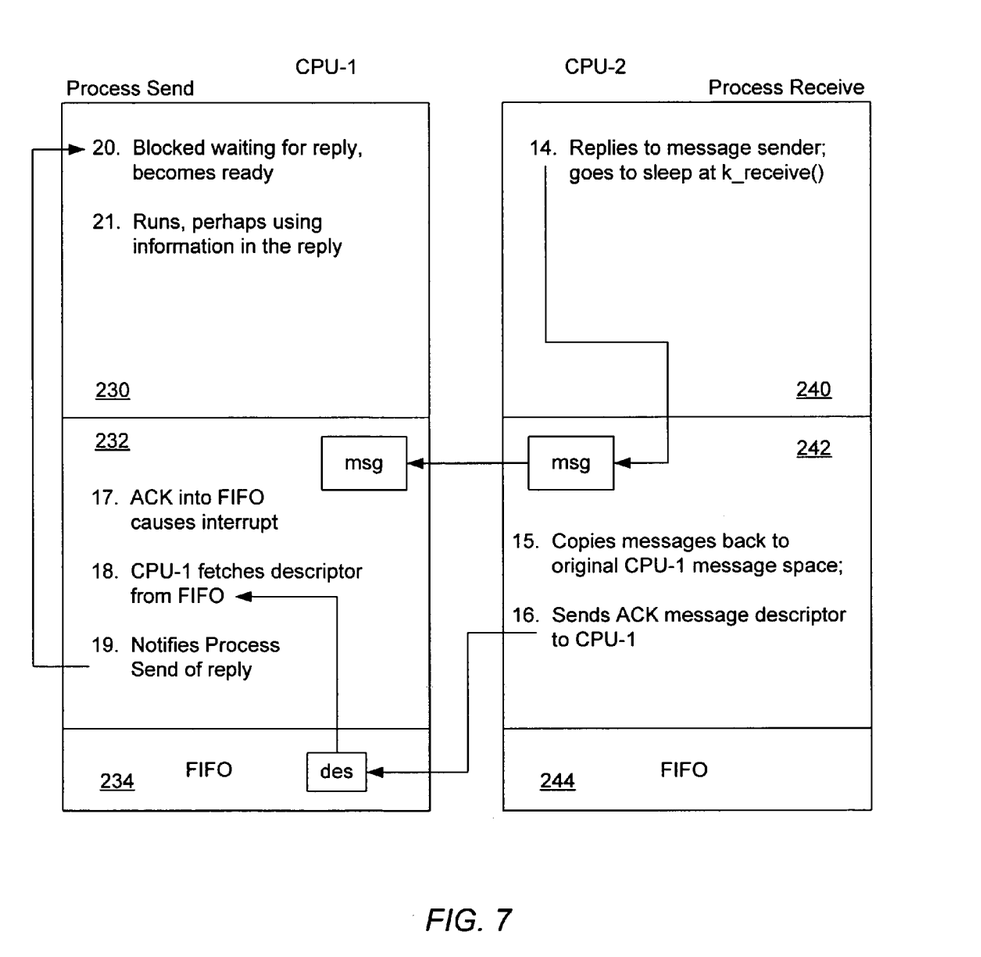
FIG. 7 is a diagram illustrating a message reply process.

FIG. 7 shows a corresponding message reply process from a process. As shown in FIG. 7, the steps are:

14. The receiving process sends a reply (this does not cause the receiving process to block). In this example, the receiving process returns to sleeping at k_receive( ), blocked until the next message arrives.
15. The microkernel layer 242 on CPU-2 DMAs message back to the original message space of CPU-1 and does a k_free_msg( ) to free local message space.
16. The microkernel layer 242 on CPU-2 pokes ACK message descriptor into FIFO 234 of CPU-1.
17. Poking of message into FIFO 234 causes an interrupt on CPU-1.
18. CPU-1 fetches message descriptor from its FIFO 234.
19. The microkernel layer 232 on CPU-1 notifies the sending process of the reply.
20. The sending process has been blocked waiting for the reply; receipt of the reply causes the sending process to become ready.
21. The sending process runs, using information in the reply message.
22. The message can be freed.

Figure 8:
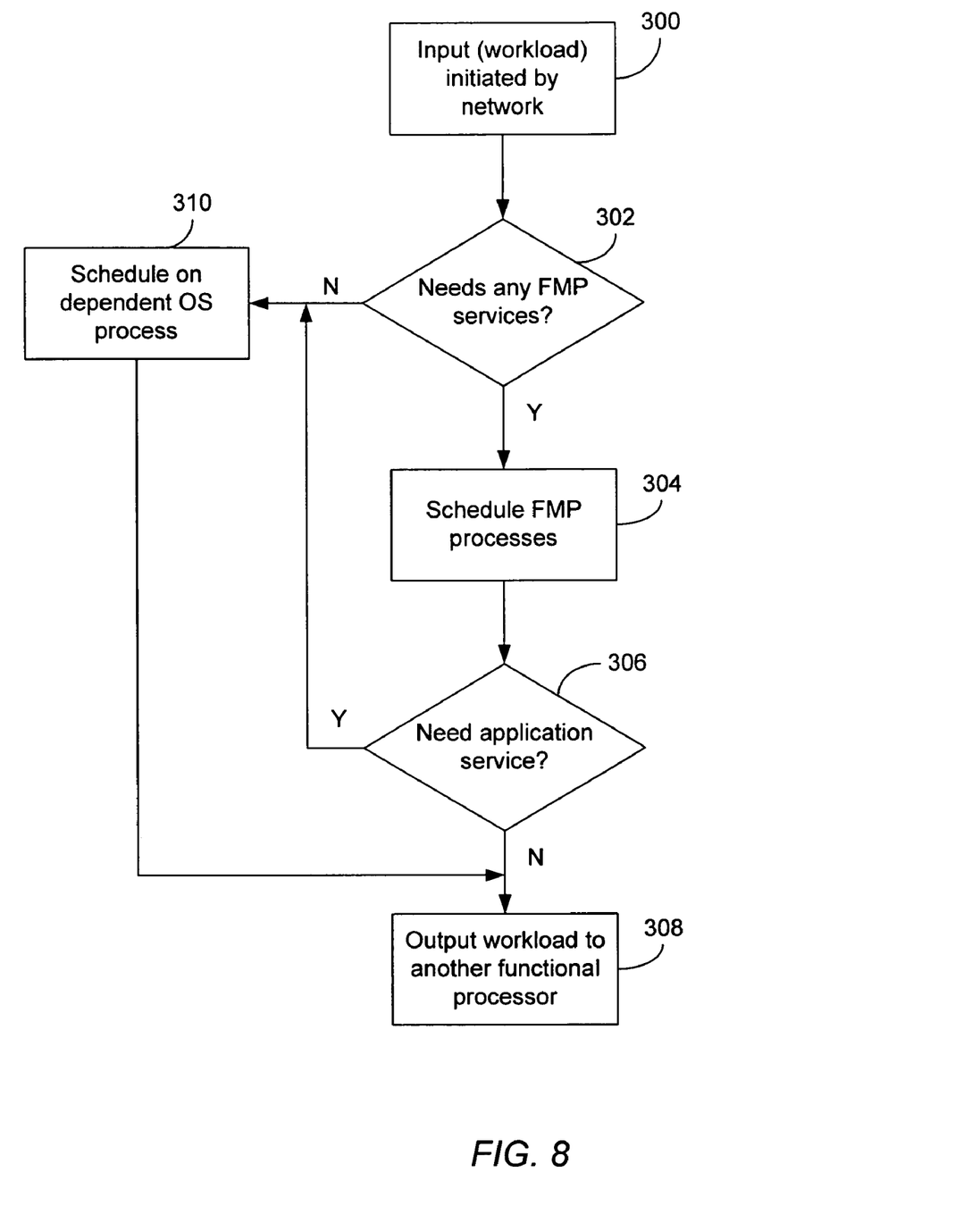
FIG. 8 is a flowchart of a process

FIG. 8 shows a flowchart for executing processes using the microkernel. First, a workload such as a system trap or error is initiated over a network (step 300). The process of FIG. 8 determines whether one or more functional multiprocessing (FMP) services are needed (step 302). FMP services include services that handle NFS, CIFS, FTP or HTTP, among others. If one or more FMP services are required, the process of FIG. 8 schedules the FMP processes as required (step 304). From step 304, the process determines whether an applications service is needed (step 306). If not, the resulting workload is sent to another functional processor for handling (step 308).

From step 302, if an FMP service is not needed, the process of FIG. 8 transitions to step 310 where it schedules the request as a dependent operating system process. Similarly, from step 306, if an application service is needed, the process of FIG. 8 schedules the request as a dependent operating system process (step 310). From step 310, the process of FIG. 8 proceeds to step 308 to output the workload to another processor.

Figure 9:
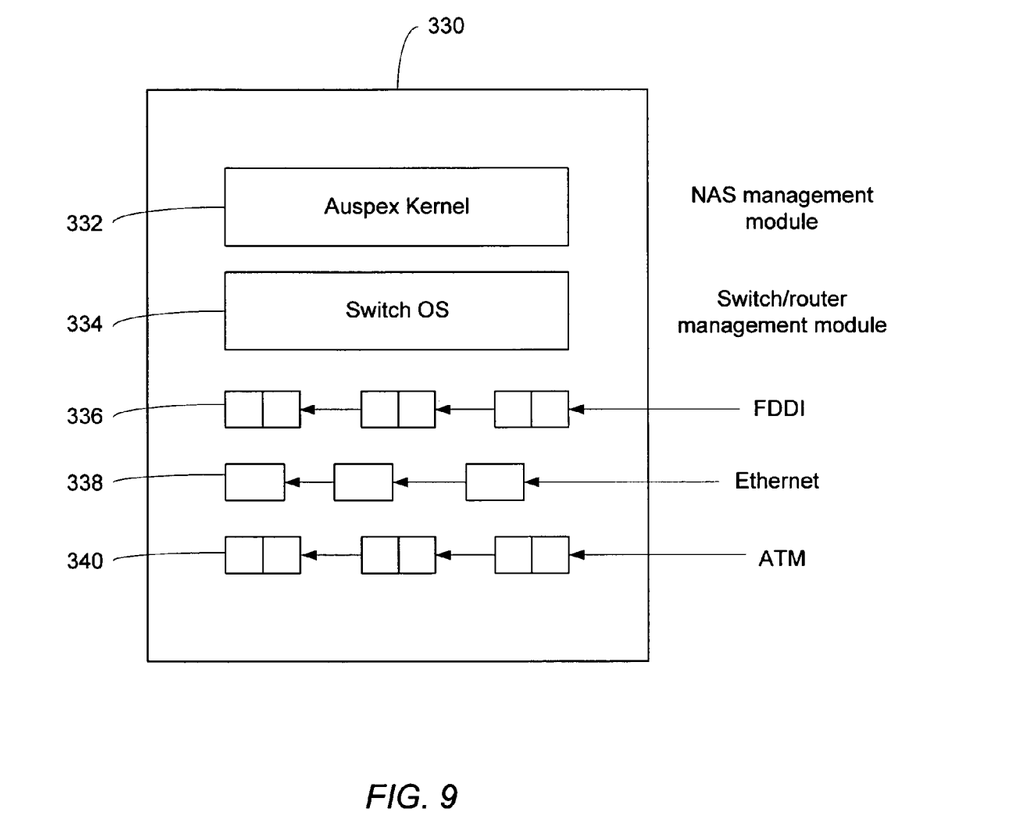
FIG. 9 is a diagram illustrating an exemplary application of the microkernel in accordance with the invention.

FIG. 9 shows an exemplary microkernel configuration that is optimized to a telecommunications application. In FIG. 9, a computer 330 executes a microkernel 332, that in this case is a network attached storage (NAS) management module. The microkernel 332 in turn executes one or more dependent operating systems 334, that in this case is a switching operating system. The switch operating system provides switch/router management services. The switch operating system in turn supervises ports that can be Fiber Distributed Data Interface (FDDI) ports 336, Ethernet ports 338 or Asynchronous Mode Transfer (ATM) ports 340.

Figure 10:
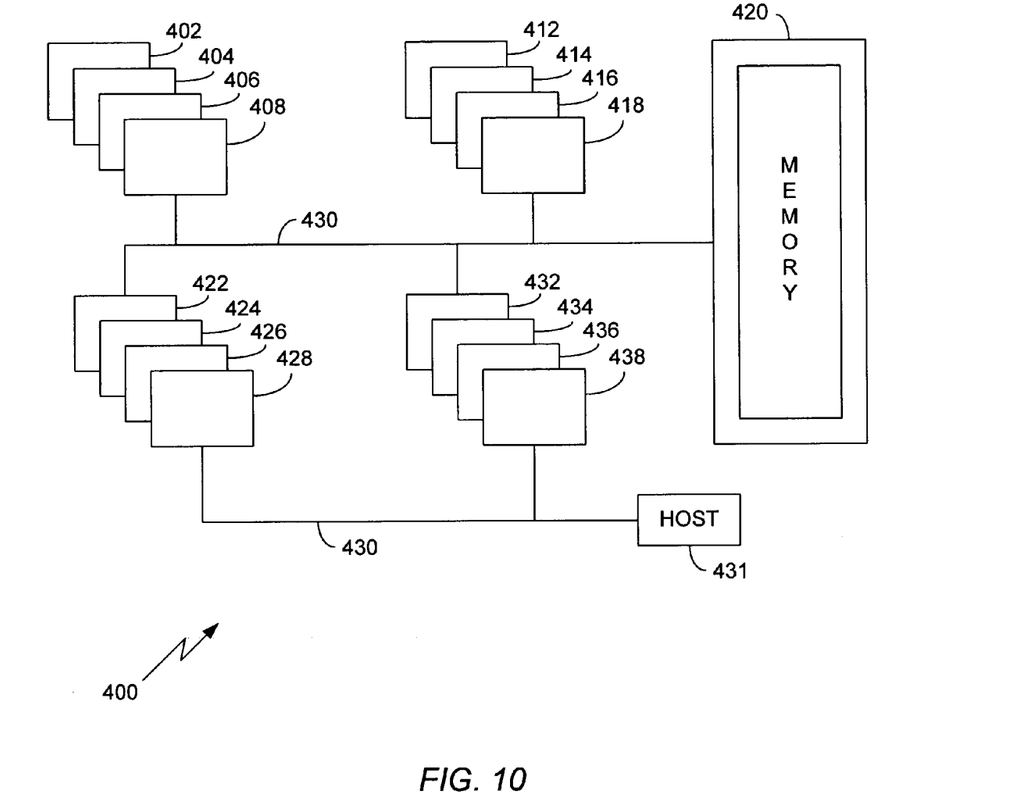
FIG. 10 is a block diagram of a first computer system that loosely couples a plurality of tightly-coupled processors.

FIG. 10 shows a computer system 400 that loosely couples a plurality of tightly coupled processors in collectively providing a high performance server. The system 400 has a plurality of processors 402–408, 412–418, 422–428 and 432–438. Each of the processors 402–408, 412–418, 422–428 and 432–438 communicates over a high speed interconnect bus 430. A memory array 420 is also connected to the bus 430. Additionally, a host processor 431 communicates with processors 402–408, 412–418, 422–428 and 432–438 over the bus 430. The memory can be local to a set of multiprocessor nodes 402–408, 412–418, 422–428 and 432–438.

Figure 11:
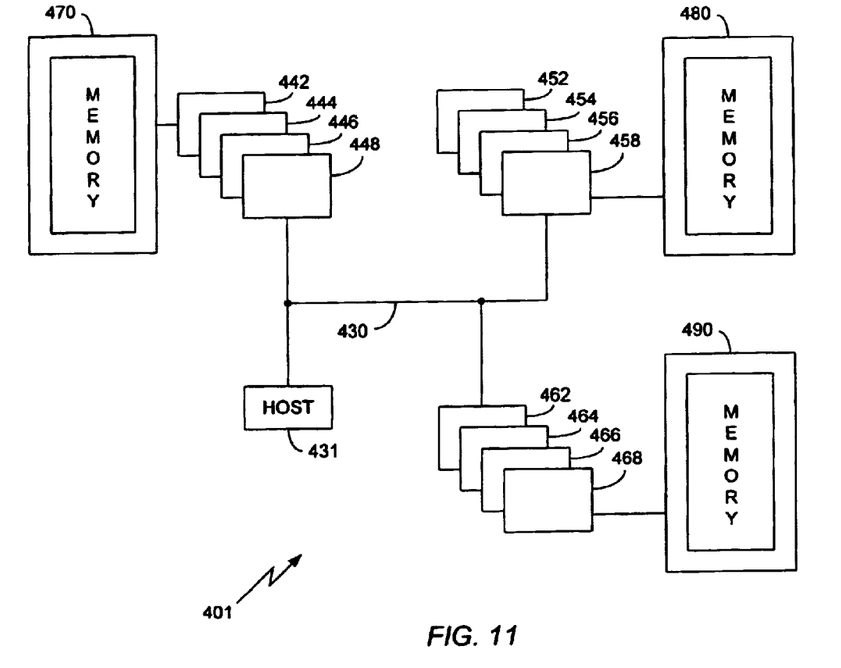
FIG. 11 is a block diagram of a second computer system that loosely couples a plurality of tightly-coupled processors.

FIG. 11 shows a computer system 401 that loosely couples a plurality of tightly coupled processors, each with its own memory. As in FIG. 10, the system 401 has a plurality of processors 442–448, 452–458 and 462–468 that communicates over the high speed interconnect bus 430. A memory subsystem 470 is locally connected to multiprocessor nodes 442–448, while memory subsystems 480 and 490 are locally connected to multiprocessor nodes 452–458 and 462–468, respectively.

In FIGS. 10 and 11, the interconnect bus 430 may be a GTL+ bus, or may be a computer bus such as a PCI bus, a SCSI bus, or a Scalable Coherent Interface (SCI) bus that is a distributed interconnect bus on both GTL and SCI. The interconnect between nodes can be a local area network or a wide area network (LAN/WAN).

In one embodiment, the bus 430 is a 100 Mhz Slot 2 system bus that enables processors such as the Pentium II Xeon processors to be "multiprocessor ready." The bus 430 has a synchronous, latched bus protocol that allows a full clock cycle for signal transmission and a full clock cycle for signal interpretation and generation. This protocol simplifies interconnect timing requirements and supports 100 Mhz system designs using conventional interconnect technology. Low-voltage-swing AGTL+I/O buffers support high frequency signal communications between many loads. In this embodiment, the processor supports ECC on the data signals for all L2 cache bus and system bus transactions, automatically correcting single-bit errors and alerting the system to any double-bit errors such that mission-critical data is protected. The processor also supports full Functional Redundancy Checking (FRC) to increase the integrity of critical applications. Full FRC compares the outputs of multiple processors and checks for discrepancies. In an FRC pair, one processor acts as a master, the other as a checker. The checker signals the system if it detects any differences between the processors' outputs.

In a second embodiment using the SCI bus, the interconnect bus 430 may be deployed using a number of topologies, including a ring configuration where subsystems are connected as a ring that is not hot-pluggable. Alternatively, the interconnect bus 430 may be a multi-ported switch where each subsystem is on its own SCI ring and therefore can be hot-plugged. Additional port switches can be used to allow the system to improve the pin very high density Small Computer System Interface (SCSI) style connectors for both the input and output of the SCI interconnect bus 430.

Also attached to the interconnect bus 430 can be a host processor 431. The host processor 431 runs an operating system such as Windows-NT, available from Microsoft Corp. of Redmond, Wash., or Solarix UNIX operating system, available from Sun Microsystems of Mountain View, Calif. The host processor 431 provides a platform for network and system administration, backup and archive operations, database management, and other applications. Functions such as network information services (NIS) and network lock manager (NLM) can also be executed on the host processor 431.

The interconnect bus 430 supports booting of processors from the host processor 431 or a master control processor. Generally, an on-board Basic Input/Output System (BIOS) initializes the processors on the bus 430 and configures it to participate on the bus 430. From there, the presence of all processors is detected by the host or control processor 431, where a configuration utility takes over, as described in more detail below.

To further improve reliability, other components in the system 400 of FIG. 10, such as the processors 402–408, 412–418, 422–428 and 432–438, may monitor the status of the host or control processor 431 and determine when the host or control processor 431 is inoperative. If the host processor 431 is hung, the processors 402–408, 412–418, 422–428 and 432–438 can force the host or control processor 431 to reboot. In this event, the processors retain any state information the host or control processor 431 requires, such as the state of the network interface cards while the host or control processor 431 boots. New status messages are saved and forwarded to the host or control processor 431 after the reboot is complete. New mount request and NIS queries are serviced as soon as the reboot is complete. In a similar manner, in the event that one of the processors 402–408, 412–418, 422–428 and 432–438 fails, the computer system 400 of FIG. 10 continues to operate without failing.

As shown in FIG. 10, the computer system 400 is a loose coupling of processors that cooperate with each other in performing server-related functions, for example, network processing, file processing, storage processing, and application processing. Due to the loosely coupled nature of the multiprocessor nodes, processors 402–408, for example, can reboot on their own due to a failure and still come back to serve their designated functionalities. The heterogeneous coupling of the processors 402–408, 412–418, 422–428 and 432–438 provides a user with the flexibility to grow the processing power of the computer system 400 as required for a specific application. For instance, certain applications require more processing power for network processing and thus more processors should be dedicated toward network processing. Other applications may require more processing power for file and storage processing and more processors should be dedicated toward these tasks.

The hybrid multi-processing or heterogeneous coupling of processors of FIGS. 10 and 11 allows the user to robustly grow the processing power of the computer systems 400 and 401. Each processor in the n-way processors can be a:

1. Network processor;
2. File Processor;
3. Storage Processor;
4. Network and File Processor;
5. Network and Storage Processor (SAS);
6. Storage and File Processor;
7. Network, Storage and File Processor (NAS); or
8. Application Processor.

Each configured network processor has a read cache for buffering previous requests for data from clients. Each network processor also has a mount table for routing data request messages to their appropriate destinations. Thus, with the mount table, the network processor can directly forward a request to an appropriate file processor(s), based on pre-determined criteria.

Each configured file processor has a metadata cache that contains file management information, including a directory name look-up table, among others. The directory name look-up table is used to speed up directory look-ups, as Unix file system (UFS) directories are flat and much be searched sequentially. Further, the directory name look-up table maintains hits and misses for short file names. In the directory name look up the structures are kept in a least recently used (LRU) order and maintained as a hashed table.

When configured as a storage processor (SP), each processor has a write cache that buffers write requests to the respective disk drives to increase I/O data transfer performance and decrease acknowledgment latencies. Due to the architecture, the network processors can individually access any of the file processors. Furthermore, each of the file processors can go through a storage processor and a disk to retrieve information requested by the client.

The network processors provide all protocol processing between the network layer data format and an internal file server format for communicating client requests to other processors in the system. Only those data packets that cannot be interpreted by the network processors, for example client requests to run a client-defined program on the server, are transmitted to the host or control processor 431 for processing. Thus the network processors, file processors and storage processors contain only small parts of an overall operating system, and each is optimized for the particular type of work to that it is dedicated.

Although the FPs are shown apart from the SPs, the FPs can be combined pairwise with their respective SPs. For instance, the combination of one FP and one SP creates a file storage processor (FSP).

The application processor can run any off-the-shelf operating system. This processor can also run specific applications. For example, the application processor can run dynamic loading of web pages or process voice and video mail management or can run Solaris or NT and can handle generic applications.

The architectures of FIGS. 10 and 11 are advantageous in that the host or control processor 431 provides a single point of administration for system utilities and tools, including monitoring, updating, backing-up and tuning software. The architectures further takes advantage of processors that are dedicated and optimized for specific tasks. As function-specific caches are provided with each processor, throughput is further increased. Additionally, the dedicated processors can transfer data with relatively low communication overheads. The resulting system is powerful, scalable and reliable enough to allow users to consolidate their data onto one high performance system that can provide data more quickly and reliably than a conventional client/server architecture.

Figure 12:
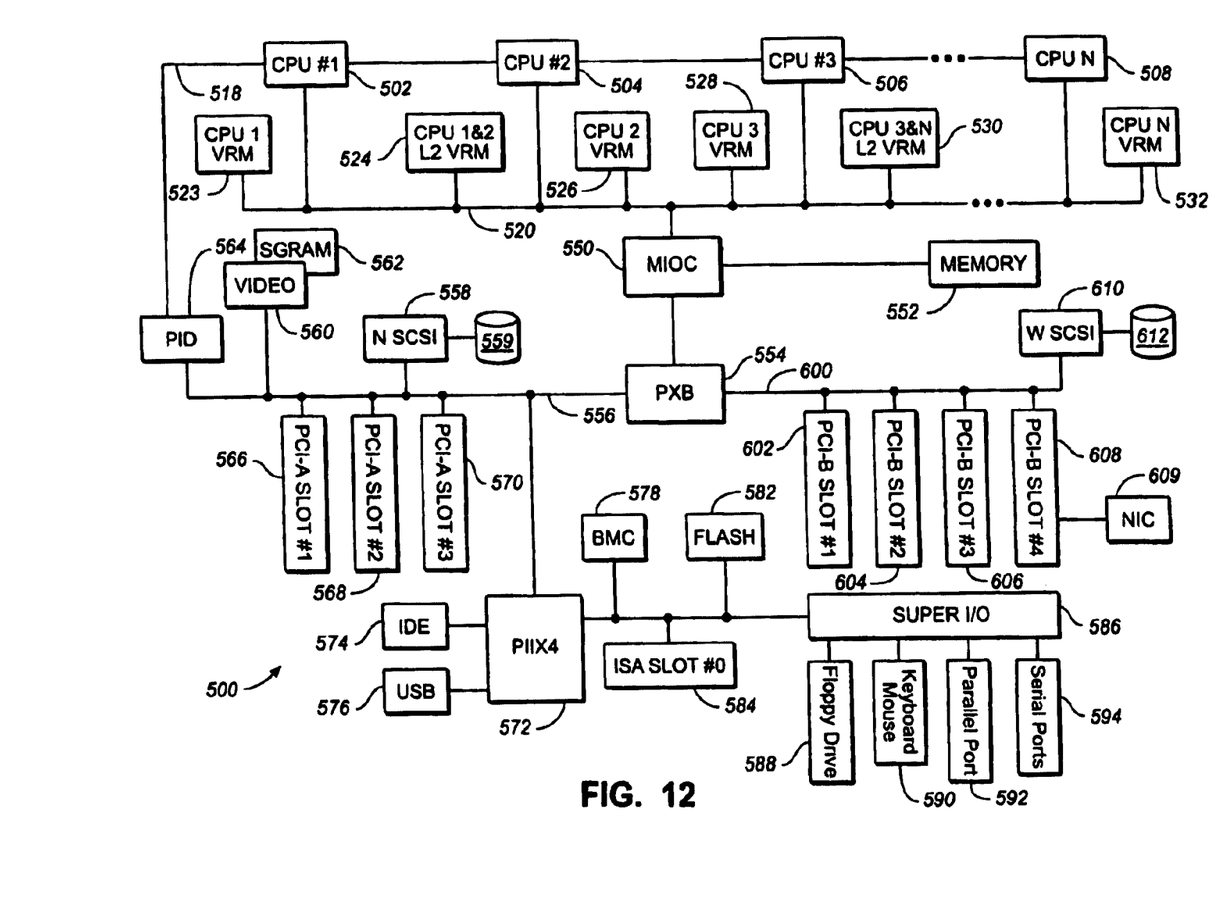
FIG. 12 is a block diagram of an n-way processor computer system.

FIG. 12 shows a block diagram of a computer system 500. The computer system 500 has a plurality of processors 502–508. Each of processors 502–508 has an associated voltage regulation module (VRM) 523, 526, 528 and 532, respectively. Additionally, processors 502 and 504 have Level 2 (L2) caches that are supported by an L2 VRM 524. Similarly, processors 506 and 508 have L2 caches that are supported by an L2 VRM 530. Moreover, processors 502–508 communicate over a high speed host bus 520. In an embodiment, the host bus 520 is a GTL+ bus operating at 100 MHZ. Also connected to the host bus 520 is a memory input output controller (MIOC) 550. The memory input output controller 550 controls a memory array 552 over a high speed bus that may also be a GTL+ bus.

The memory input output control of 550 is also connected to a PCI expansion bridge (PXB) 554. The PXB 554 drives a first PCI bus (PCI-A) bus 556. Connected to the PCI-A bus 556 are a video controller 560 and a video memory 562. The video memory 562 may be a synchronous graphics random access memory (SGRAM).

Also connected to the PCI-A bus 556 is a programmable interrupt device (PID) 564. The PID 564 controls an advanced processor interrupt controller (APIC) bus 518. The bus 518 communicates with each of CPUs 502–508. Interrupts are managed and broadcasted to local APICs in each of processors 502–508. The PID 564 monitors each interrupt on each PCI device, including PCI slots 566–570 in addition to compatible interrupts IRQ0–IRQ15, and on occurrence of an interrupt, sends a message corresponding to the interrupt across a three wire serial interface to the local APICs. The APIC bus 518 minimizes interrupt latency for compatibility between the interrupt sources. The PID 564 can also supply more than 16 interrupt levels to processors 502–508. The APIC bus 518 has an APIC clock and two bidirectional data lines. The interrupts can be disabled and all processor nodes can poll each I/O device for its status. For example, each processor node can poll a status bit of a receive/transmit buffer on the NIC to determine whether a packet has been received or transmitted.

The PCI-A bus 556 is also connected to a narrow small computer system interface (N SCSI) interface 558. The N SCSI interface 558 in turn controls one or more data storage devices 559. The narrow SCSI host adaptor may be a Symbios SYM53C810AE, that contains a high performance SCSI core capable of fast 8-byte SCSI transfers in single-ended mode.

Also connected to the PCI-A bus 556 is a bridge to an ISA input output subsystem (PIIX4) 572. The PIIX4 provides an IDE floppy controller 574, a universal serial bus (USB) controller 576, a baseboard management controller (BMC) 578, a flash memory 582 for BIOS ROM and extension storage, and an ISA slot 584. The PIIX4 572 also communicates with a Super Input/Output device 586 that drives a floppy drive 588, a keyboard/mouse port 590, a parallel port 592 and one or more serial ports 594.

The PXB 554 also provides a second PCI bus (PCI-B) 600. The PCI-B bus 600 has a plurality of PCI-B slots 602–608 with PCI-B slot 608 connected to NIC 609. Also, PCI-B bus 600 is connected to a wide SCSI (W SCSI) controller 610. The wide SCSI controller 610 may be a Symbios SYM53C896 dual channel LVD/SE (Ultra 2/Ultra) SCSI controller. The wide SCSI controller 610 in turn drives one or more data storage devices 612.

The above described software can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the following claims.

What is claimed is:

1. A computer program product tangibly stored on a machine readable medium, computer program product comprising:
   a non-preemptive microkernel executing two or more processes in accordance with a non-preemptive scheduling scheme, wherein a lower priority process executed by the non-preemptive microkernel relinquishes a processor for a higher priority process to execute only when the lower priority process blocks or explicitly requests to be preempted; and
   one or more kernels each being executed as a process by the non-preemptive microkernel,
   wherein at least one of the one or more kernels executes an operating system as a dependent process, the operating system being a time-sliced operating system or a time-sliced microkernel.

2. The computer program product of claim 1, wherein the operating system is Unix.

3. The computer program product of claim 1, wherein each of the two or more processes executed by the non-preemptive microkernel has its own stack.

4. The computer program product of claim 1, wherein each of the two or more processes executed by the non-preemptive microkernel communicate using one or more messages.

5. The computer program product of claim 1, wherein each of the two or more processes executed by the non-preemptive microkernel has a unique process identifier (PID).

6. The computer program product of claim 5, further comprising a mailbox coupled to a plurality of processes to service messages sent to a single PID.

7. The computer program product of claim 1, wherein each of the two ore more processes executed by the non-preemptive microkernel never terminates.

8. The computer program product of claim 1, wherein one of the one or more kernels is a microkernel.

9. A method for operating a computer system including a CPU, comprising:
   managing two or more processes with a non-preemptive microkernel, the microkernel executing the two or more processes in accordance with a non-preemptive scheduling scheme, wherein a lower priority process executed by the non-preemptive microkernel relinquishes the CPU for a higher priority process to execute only when the lower priority process blocks or explicitly requests to be preempted;
   executing one or more kernels as one or more processes managed by the non-preemptive microkernel; and
   executing an operating system in one of the one or more kernels as a dependent process, the operating system being a time-sliced operating system or a time-sliced microkernel.

10. The method of claim 9, wherein the operating system is Unix.

11. The method of claim 9, wherein each of the two or more processes executed by the non-preemptive microkernel has its own stack.

12. The method of claim 9, further comprising performing inter-process communication using one or more messages.

13. The method of claim 9, wherein each of the two or more processes executed by the non-preemptive microkernel has a unique process identifier (PID).

14. The method of claim 13, further comprising servicing messages sent to a single PID by a plurality of processes using a mailbox.

15. The method of claim 9, further comprising executing the two or more processes without termination.

16. The method of claim 9, further comprising executing a microkernel in one of the one or more kernels.

17. A computer system, comprising:
   a processor;
   means for managing two or more processes with a non-preemptive microkernel, the microkernel executing the two or more processes in accordance with a non-preemptive scheduling scheme, wherein a lower priority process executed by the non-preemptive microkernel relinquishes the processor for a higher priority process to execute only when the lower priority process blocks or explicitly requests to be preempted;
   means for executing one or more kernels as one or more processes managed by the non-preemptive microkernel; and
   means for executing an operating system in one of the one or more kernels as a dependent process, the operating system being a time-sliced operating system or a time-sliced microkernel.

18. The system of claim 17, wherein the operating system is Unix.

19. The system of claim 17, wherein each of the two or more processes executed by the non-preemptive microkernel has its own stack.

20. The system of claim 17, further comprising means for performing inter-process communication using one or more messages.

21. The system of claim 17, wherein each of the two or more processes executed by the non-preemptive microkernel has a unique process identifier (PID).

22. The system of claim 21, further comprising means for servicing messages sent to a single PID by a plurality of processes using a mailbox.

23. The system of claim 17, further comprising means for executing each of the two or more processes executed by the non-preemptive microkernel without termination.

24. The system of claim 17, further comprising means for executing a microkernel in one of the one or more kernels.

25. A computer, comprising:
   an interconnect bus;
   one or more processors coupled to the interconnect bus and adapted to be configured for server-specific functionalities including network processing, file processing, storage processing and application processing;
   a configuration processor coupled to the interconnect bus and to the processors, the configuration processor dynamically assigning processor functionalities upon request;
   one or more data storage devices coupled to the processors and managed by a file system;
   a non-preemptive microkernel executing two or more processes in accordance with a non-preemptive scheduling scheme, wherein a lower priority process executed by the non-preemptive microkernel relinquishes one of the one or more processors for a higher priority process to execute only when the lower priority process blocks or explicitly requests to be preempted; and
   one or more kernels each being executed as a process by the non-preemptive microkernel,
   wherein at least one of the one or more kernels executes an operating system as a dependent process, the operating system being a time-sliced operating sysetm or a time-sliced microkernel.

26. The computer of claim 25, wherein the non-preemptive microkernel executes a network switch operating system as a dependent process.

* * * * *